US009865252B2

(12) United States Patent
Bak et al.

(10) Patent No.: US 9,865,252 B2
(45) Date of Patent: Jan. 9, 2018

(54) VOICE RECOGNITION APPARATUS AND METHOD FOR PROVIDING RESPONSE INFORMATION

(71) Applicant: SAMSUNG ELECTRONICS CO., LTD., Suwon-si (KR)

(72) Inventors: Eun-sang Bak, Ansan-si (KR); Kyung-duk Kim, Suwon-si (KR); Myung-jae Kim, Suwon-si (KR); Yu Liu, Suwon-si (KR); Seong-han Ryu, Seoul (KR); Geun-bae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 810 days.

(21) Appl. No.: 14/169,177

(22) Filed: Jan. 31, 2014

(65) Prior Publication Data

US 2014/0214425 A1    Jul. 31, 2014

(30) Foreign Application Priority Data

Jan. 31, 2013    (KR) ........................ 10-2013-0011292

(51) Int. Cl.
*G10L 21/00* (2013.01)
*G10L 25/00* (2013.01)
(Continued)

(52) U.S. Cl.
CPC .............. *G10L 15/08* (2013.01); *G10L 15/22* (2013.01); *G06F 17/2705* (2013.01); *G10L 2015/223* (2013.01)

(58) Field of Classification Search
CPC ..... G10L 15/1822; G10L 15/26; G10L 15/22; G10L 15/197; G10L 15/08; G10L 15/18
(Continued)

(56) References Cited

U.S. PATENT DOCUMENTS 6,314,398 B1 * 11/2001 Junqua ................ G10L 15/1822
348/E5.105
7,904,297 B2 * 3/2011 Mirkovic ................ G06F 17/28
704/235
(Continued)

FOREIGN PATENT DOCUMENTS

CN    102075797 A    5/2011
CN    102255780 A    11/2011
(Continued)

OTHER PUBLICATIONS

Komatani et al, "Multi-Domain Spoken Dialogue System with Extensibility and Robustness against Speech Recognition Errors", 2996, In Proceedings of the 7th SIGdial Workshop on Discourse and Dialogue, pp. 9-17.*

(Continued)

*Primary Examiner* — Olujimi Adesanya
(74) *Attorney, Agent, or Firm* — Sughrue Mion, PLLC

(57) ABSTRACT

A voice recognition apparatus and a method for providing response information are provided. The voice recognition apparatus according to the present disclosure includes an extractor configured to extract a first utterance element representing a user action and a second utterance element representing an object from a user's utterance voice signal; a domain determiner configured to detect an expansion domain related to the extracted first and second utterance elements based on a hierarchical domain model, and determine at least one candidate domain related to the detected expansion domain as a final domain; a communicator which performs communication with an external apparatus; and a controller configured to control the communicator to transmit information regarding the first and second utterance elements and information regarding the determined final domain.

20 Claims, 9 Drawing Sheets

(51) Int. Cl.
G06F 17/27 (2006.01)
G10L 15/00 (2013.01)
G10L 15/26 (2006.01)
G10L 17/00 (2013.01)
G10L 15/08 (2006.01)
G10L 15/22 (2006.01)

(58) Field of Classification Search
USPC .................. 704/9, 231, 235, 246, 270, 275
See application file for complete search history.

(56) References Cited

U.S. PATENT DOCUMENTS

| | | | | |
|---|---|---|---|---|
| 8,346,563 | B1* | 1/2013 | Hjelm | G10L 15/1822 379/88.01 |
| 8,527,269 | B1* | 9/2013 | Kapur | G06F 17/2735 704/235 |
| 8,566,097 | B2* | 10/2013 | Nakano | G10L 15/063 704/246 |
| 8,892,419 | B2* | 11/2014 | Lundberg | G06F 17/28 704/257 |
| 2002/0059289 | A1* | 5/2002 | Wenegrat | G06F 17/30734 |
| 2002/0087315 | A1* | 7/2002 | Lee | G06Q 30/06 704/9 |
| 2002/0095286 | A1 | 7/2002 | Ross et al. | |
| 2002/0173960 | A1 | 11/2002 | Ross et al. | |
| 2005/0102141 | A1 | 5/2005 | Chikuri | |
| 2006/0020917 | A1* | 1/2006 | Hying | G06F 9/4443 717/115 |
| 2006/0184370 | A1* | 8/2006 | Kwak | G10L 15/1822 704/275 |
| 2007/0033005 | A1* | 2/2007 | Cristo | G06F 17/279 704/9 |
| 2013/0110519 | A1* | 5/2013 | Cheyer | G06F 17/3087 704/275 |
| 2014/0136212 | A1* | 5/2014 | Kwon | G10L 15/22 704/275 |
| 2014/0350933 | A1* | 11/2014 | Bak | G10L 15/1822 704/249 |
| 2014/0365209 | A1* | 12/2014 | Evermann | G06F 17/279 704/9 |

FOREIGN PATENT DOCUMENTS

| | | |
|---|---|---|
| CN | 102572569 A | 7/2012 |
| CN | 102611860 A | 7/2012 |
| CN | 102833610 A | 12/2012 |

OTHER PUBLICATIONS

Lee et al, "Example-based dialog modeling for practical multi-domain dialog system", In Speech Communications, 51(5):466-484. 2009.*

Nakano et al, "A Two-Stage Domain Selection Framework for Extensible Multi-Domain Spoken Dialogue Systems", In Proceedings of the SIGDIAL 2011: the 12th Annual Meeting of the Special Interest Group on Discourse and Dialogue, pp. 18-29.*

Noh et al, "Ontology-based inference for information-seeking in natural language dialog system," 2008, In 6th IEEE International Conference on Industrial Informatics, Daejeon, 2008, pp. 1469-1474.*

Eun et al, "A multiple classifier-based concept-spotting approach for robust spoken language understanding", 2005, In Proceedings of European Conference on Speech Communication and Technology 2005, pp. 3441-3444.*

Communication dated May 27, 2014 issued by the European Patent Office in counterpart European Patent Application No. 14151593.2.

Christel Kemke, "Action Representation for Natural Language Interfaces to Agent Systems", Hybrid Information Technology, pp. 1-5, Nov. 9, 2006, XP032070140.

Communication dated Sep. 24, 2015, issued by the European Patent Office in counterpart European Patent Application No. 14151593.2.

Communication dated Nov. 16, 2017, issued by the State Intellectual Property Office of P.R. China in counterpart Chinese Application No. 201410041514.1.

* cited by examiner

VOICE RECOGNITION APPARATUS AND METHOD FOR PROVIDING RESPONSE INFORMATION

CROSS-REFERENCE TO RELATED APPLICATIONS

This application claims priority from Korean Patent Application No. 10-2013-0011292, filed on Jan. 31, 2013, the disclosure of which is incorporated herein by reference.

BACKGROUND

1. Field

Methods and apparatuses consistent with exemplary embodiments relate to a voice recognition apparatus and method for providing response information, and more particularly, a voice recognition apparatus for providing response information corresponding to an utterance voice of a user, and a method for providing response information thereof.

2. Description of the Related Art

When an utterance voice of a user is received, a related art voice recognition apparatus analyzes the received utterance voice of the user to determine a domain intended by the user, and provides response information on the utterance voice of the user based on the determined domain.

However, as services of domains (related area) and services that should be provided in such a related art voice recognition apparatus becomes more diverse and complicated, there emerges a problem that the voice recognition apparatus determines a domain not intended by the user, and provides response information on the utterance voice of the user based on the determined unintended domain.

For example, when an utterance voice "what kinds of action movies are there?" is received from the user, a television (TV) program and/or a video on demand (VOD) related domain may be determined with reference to such an utterance voice, whereas a conventional voice recognition apparatus detects only one domain from among a plurality of domains without considering the possibility of such multiple domains. For example, the utterance voice "what kinds of action movies are there?" from the user may include the user's intention regarding the action movie provided in the TV program. However, the voice recognition apparatus may arbitrarily determine the VOD related domain from the user's utterance voice regardless of the user's intention, and may provide response information regarding the user's utterance voice based on the determined VOD related domain. As such, in a conventional voice recognition apparatus, there often occurs cases where response information not intended by the user is provided, and thus, the user must put up with the inconvenience of having to provide a further detailed utterance voice in order to be provided with the response information intended.

SUMMARY

One or more exemplary embodiments provide a voice recognition apparatus for providing response information corresponding to an utterance voice of a user, and a method for providing response information thereof. More particularly, one or more exemplary embodiments determine a domain in accordance with a user's intention, from among the multiple domains possible based on a user's utterance voice, in a voice recognition apparatus providing response information on the user's utterance voice in a dialogue type system, and provide response information on the user's utterance voice based on the determined domain.

According to an aspect of an exemplary embodiment, there is provided a dialogue type voice recognition apparatus including an extractor configured to extract a first utterance element representing a user action and a second utterance element representing an object from a user's utterance voice signal; a domain determiner configured to detect an expansion domain related to the extracted first and second utterance elements based on a predetermined hierarchical domain model, and determine at least one candidate domain related to the detected expansion domain as a final domain; and a communicator configured to perform communication with an external apparatus; and a controller configured to control the communicator to transmit information regarding the first and second utterance elements and information regarding the determined final domain.

The hierarchical domain model may consist of a candidate domain of a lowermost concept, where a main action corresponding to the first utterance element and a component slot corresponding to a second utterance element are matched to each other, and a virtual expansion domain predetermined as a superior concept of the candidate domain.

The domain determiner may use a multi classifier to detect a subordinate candidate domain related to the detected expansion domain, when the expansion domain where the main action corresponding to the first utterance element and the component slot corresponding to the second utterance element extracted from the extractor matched to each other is detected, and detect a candidate domain where a main action corresponding to the first utterance element and the component slot corresponding to the second utterance element matched to each other, when the expansion domain is not detected.

The domain determiner may use at least one binary classifier to detect at least one domain from among the candidate domain, where the main action corresponding to the first utterance element and the component slot corresponding to the second utterance element are matched to each other, and the expansion domain.

The domain determiner may understand a user's intention from at least one of the extracted first and second utterance elements and the detected candidate domain to determine whether or not a context initialization occurred, and when it is determined that a context initialization has not occurred, determine at least one candidate domain from among the detected candidate domains as a final domain based on a previous domain, the previous domain being the domain determined from the user's previous utterance voice before receiving the user's utterance voice signal.

The domain determiner may determine the previous domain as the final domain when one candidate domain from among the detected candidate domains and the previous domain correspond to each other.

The domain determiner may determine the candidate domain related to the first utterance element representing the user action from among at least one candidate domain related to the detected expansion domain as the final domain, when it is determined that the detected candidate domain and the previous domain are different from each other or the context initialization has occurred.

The domain determiner may determine all the detected candidate domains as the final domain when the detected candidate domain includes main action information corresponding to the first utterance element representing the user action.

The domain determiner may determine the candidate domain selected by the user as the final domain or arbitrarily select one candidate domain of among the detected candidate domains to determine as the final domain, when the detected candidate domain includes the main action information corresponding to the first utterance element representing the user action.

The domain determiner may determine the candidate domain corresponding to the previous domain from among the detected candidate domains as the final domain, when there are a plurality of previous domains, one of the plurality of previous domains and one of the candidate domains correspond to each other, and the candidate domain includes main action information corresponding to the first utterance element representing the user action.

According to an aspect of an exemplary embodiment, there is provided a method of providing response information corresponding to a user's utterance voice in a dialogue type voice recognition apparatus, the method including extracting a first utterance element representing a user action and a second utterance element representing an object from a user's utterance voice signal; detecting an expansion domain related to the extracted first and second utterance elements based on a predetermined hierarchical domain model; determining at least one candidate domain related to the detected expansion domain as a final domain; and transmitting information regarding the first and second utterance elements and information regarding the determined final domain to an external apparatus.

The hierarchical domain model may consist of a candidate domain of a lowermost concept, where a main action corresponding to the first utterance element and a component slot corresponding to a second utterance element are matched to each other, and a virtual expansion domain predetermined as a superior concept of the candidate domain.

The detecting the expansion domain may use a multi classifier to detect a subordinate candidate domain related to the detected expansion domain, when the expansion domain where the main action corresponding to the first utterance element and the component slot corresponding to the second utterance element extracted from the extractor are matched to each other is detected, and detect a candidate domain where a main action corresponding to the first utterance element and a component slot corresponding to the second utterance element are matched to each other, when the expansion domain is not detected.

The detecting the expansion domain may use at least one binary classifier to detect at least one domain from among the candidate domain, where the main action corresponding to the first utterance element and the component slot corresponding to the second utterance element are matched to each other, and the expansion domain.

The determining the final domain may understand a user's intention from at least one of the extracted first and second utterance elements and the detected candidate domain to determine whether or not a context initialization occurred, and when it is determined that a context initialization has not occurred, determines at least one candidate domain from among the detected candidate domains as a final domain based on a previous domain, the previous domain being the domain determined from the user's previous utterance voice before receiving the user's utterance voice signal.

The determining the final domain may incorporate determining the previous domain as the final domain when one candidate domain of among the detected candidate domains and the previous domain correspond to each other.

The determining the final domain may determine the candidate domain related to the first utterance element representing the user action from among at least one candidate domain related to the detected expansion domain as the final domain, when it is determined that the detected candidate domain and the previous domain are different from each other or the context initialization has occurred.

The determining the final domain may determine all the detected candidate domains as the final domain when the detected candidate domains includes main action information corresponding to the first utterance element representing the user action.

The determining the final domain may determine the candidate domain selected by the user as the final domain or arbitrarily select one candidate domain of among the detected candidate domains to determine as the final domain, when the detected candidate domain includes the main action information corresponding to the first utterance element representing the user action.

The determining the final domain may determine the candidate domain corresponding to the previous domain from among the detected candidate domains as the final domain, when there are a plurality of previous domains, one of the plurality of previous domains and one of the candidate domains correspond to each other, and the candidate domain includes main action information corresponding to the first utterance element representing the user action.

As aforementioned, according to various exemplary embodiments, the voice recognition apparatus in a dialogue type system may determine a domain appropriate to the user's intention in consideration of various number of cases regarding the user's utterance voice and may provide response information on the user's utterance voice based on the determined domain.

BRIEF DESCRIPTION OF THE DRAWINGS

The above and/or other aspects will be more apparent by describing certain exemplary embodiment with reference to the accompanying drawings, in which.

DETAILED DESCRIPTION

Certain exemplary embodiments are described in higher detail below with reference to the accompanying drawings.

Figure 1:
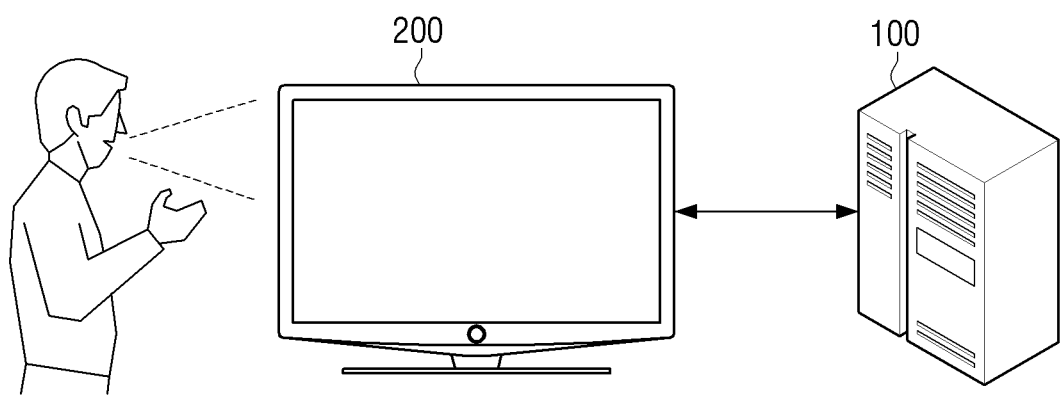
FIG. 1 is an exemplary embodiment of a dialogue-type system according to an exemplary embodiment.

FIG. 1 is a view of a dialogue type system, according to an exemplary embodiment.

As illustrated in FIG. 1, a dialogue type system includes a voice recognition apparatus 100 and a display apparatus 200. The voice recognition apparatus 100 receives a user's utterance voice signal (hereinafter referred to as an "utterance voice") through a display apparatus 200, and determines which domain the received user's utterance voice belongs to. Next, the voice recognition apparatus 100 may generate response information on the user's utterance voice based on a dialogue pattern of the determined domain. However, the present disclosure is not limited thereto, and the voice recognition apparatus 100 and the display apparatus 200 may be embodied as one apparatus, and may collect utterance voice of a user, determine a domain to which the collected utterance voice of the user belongs to, and generate response information on the utterance voice of the user based on the dialogue pattern of the determined domain.

The display apparatus 200 may be a smart TV, but this is merely an exemplary embodiment, and thus may be embodied as various electronic devices such as a mobile phone/smart phone, desktop PC, notebook, navigation system etc. The display apparatus 200 transmits the collected user's utterance voice to the voice recognition apparatus 100. As mentioned before, the voice recognition apparatus 100 determines the domain to which the user's utterance voice, received from the display apparatus 200, belongs to, generates response information on the user's utterance voice based on the determined dialogue pattern of the domain to which the user's utterance voice, received from the display apparatus 200, belongs to, and transmits the generated response information to the display apparatus 200. Accordingly, the display apparatus 200 may output the response information, received from the voice recognition apparatus 100, through a speaker or display on a screen.

For example, when an utterance voice "show me an action movie!" is received from the user, the voice recognition apparatus 100 analyzes the received utterance voice and detects at least one candidate domain regarding the utterance voice. More specifically, the voice recognition apparatus 100 may extract a first utterance element which represents a user action "show me" and a second utterance element which represents an object "action movie" from the utterance voice "show me an action movie!". Next, the voice recognition apparatus 100 may determine the user's intention "search_program(genre)" based on the extracted first and second utterance element, and determines whether or not there is an expansion domain which includes "search_program(genre)" based on a predetermined hierarchical domain module. Herein, the expansion domain is a virtual domain predetermined as a superior concept of the candidate domain for determining the expansion domain as the final domain.

When it is determined that the expansion domain including "search_program(genre)" is video contents, the voice recognition apparatus 100 detects a subordinate domain to which the expansion domain corresponding to "search_program(genre)" belongs to. When the subordinate candidate domain belonging to the video contents expansion domain is a TV program and VOD, the voice recognition apparatus 100 may detect the candidate domain corresponding to the TV program and VOD.

When such a candidate domain is detected, the voice recognition apparatus 100 may determine at least one candidate domain as the final domain based on a previous domain, predetermined according to previous dialogue contents and detected candidate domain.

For example, when the previous domain, predetermined according to previous dialogue contents and detected candidate domain, is VOD, the voice recognition apparatus 100 may determine the candidate domain corresponding to VOD as the final domain. When such a final domain is determined, the voice recognition apparatus 100 transmits information on the pre-extracted first and second utterance element and information on the predetermined final domain to the external apparatus (not illustrated). The external apparatus (not illustrated) may generate response information related to the user's utterance voice within the predetermined final domain corresponding to VOD and transmit the generated response information to the voice recognition apparatus 100. The voice recognition apparatus 100 may then transmit the response information received from the external apparatus (not illustrated) to the display apparatus 200. However, the present disclosures is not limited thereto, and when the candidate domain corresponding to VOD is determined as the final domain, the voice recognition apparatus 100 may generate response information regarding the user's utterance voice based on the pre-extracted first and second utterance element within the determined final domain, and transmit the generated response information to the display apparatus 200. Accordingly, the display apparatus 200 may then output the response information received from the voice recognition apparatus 100 through the speaker or display the response information on the screen.

Herein below is a detailed explanation on the voice recognition apparatus 100 which provides response information to the user's utterance voice in a dialogue type system according to the present disclosure.

Figure 2:
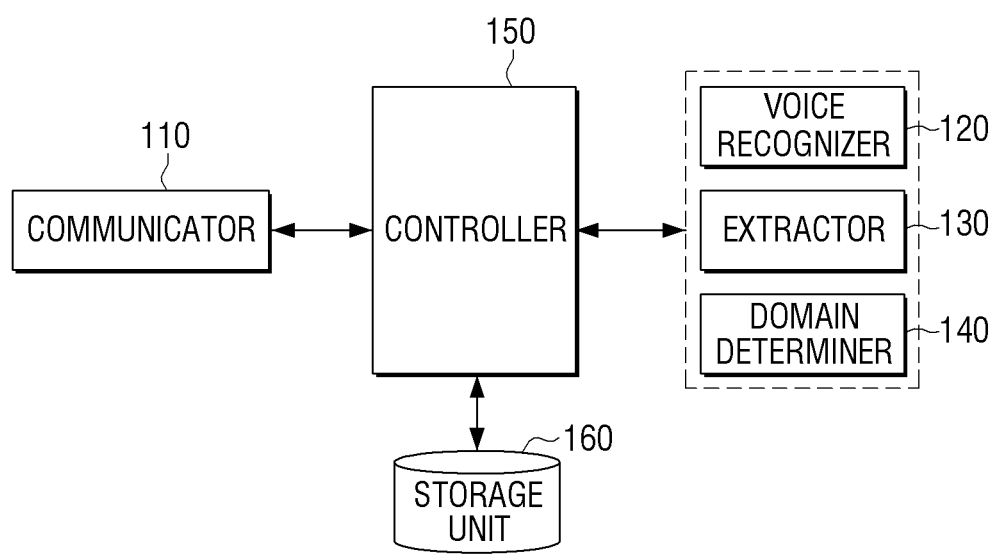
FIG. 2 is a block diagram of a voice recognition apparatus according to an exemplary embodiment.

FIG. 2 is a block diagram of a voice recognition apparatus according to an exemplary embodiment.

As illustrated in FIG. 2, the voice recognition apparatus 100 includes a communicator 110, a voice recognizer 120, an extractor 130, a domain determiner 140, a controller 150, and a storage unit 160.

The communicator 110 performs data communication with the display apparatus 200 and receives the user's utterance voice collected by the display apparatus 200. In addition, the communicator 110 may perform communication with an external apparatus (not illustrated) and may transmit information on the determined final domain to generate response information on the user's utterance voice and information on the utterance element extracted from the user's utterance voice. The communicator 110 may include various communication modules such as a short distance wireless communicator module (not illustrated), etc. Herein, a short distance wireless communication module is a module for performing communication with an external device located nearby, according to a short distance wireless communication method such as Bluetooth, zigbee, etc.

Besides the above, mobile communication modules which access the mobile communication network and perform communication according to various mobile communication standards such as 3G (3rd Generation), 3GPP (3rd Generation Partnership Project), LTE (Long Term Evolution), etc. may be further included in the communicator 110.

In addition, the communicator 110 may perform communication with a web server (not illustrated) through an Internet network, and transmit various search keywords to the web server (not illustrated) and receive web search results according thereto. Herein, a search keyword may include various keywords such as weather related keywords (for example, a name of area, a temperature, a rainfall probability, etc.), and contents related keywords (for example, a movie title, a movie release date, a music title, a singer, etc.). The various keywords may be pre-stored in the storage unit 160.

The voice recognizer 120 recognizes the user's utterance voice received from the display apparatus 200 through the communicator 110 and converts the recognized utterance voice into text. According to exemplary embodiments, the voice recognizer 120 may use a speech-to-text (STT) algorithm to convert the user's received utterance voice to text. When the user's utterance voice is converted into text through the voice recognizer 120, the extractor 130 extracts an utterance element from the user's utterance voice converted into text. More specifically, the extractor 130 may extract the utterance elements from the text, converted from the user's utterance voice, based on a corpus table pre-stored in the storage unit 160. Herein, the utterance element is a keyword, within the user's utterance voice, for performing an operation that the user requested, and may be classified as a first utterance element which represents a user action and a second utterance element which represents major features. For example, in the case of the user's utterance voice "show me an action movie!", the extractor 130 may extract the first utterance element which represents the user action "show me!" and the second utterance element which represents the object "action movie".

When the first and second utterance elements are extracted, the domain determiner 140 detects the expansion domain related to the first and second utterance elements based on the hierarchical domain model, predetermined and stored in the storage unit 160. Next, the domain determiner 140 determines at least one candidate domain related to the detected expansion domain as the final domain. Herein, the hierarchical domain model, predetermined and stored in the storage unit 160, is a domain model hierarchically consisting of a candidate domain of a lowermost concept where a main action corresponding to the first utterance element extracted per utterance voice and a component slot corresponding to the second utterance element are matched to each other, and a virtual expansion domain predetermined as a superior concept of each candidate domain.

Therefore, the domain determiner 140 may detect an expansion domain related to the first and second utterance element based on such a hierarchical domain model, and when such an expansion domain is detected, the domain determiner 140 may determine at least one candidate domain related to the detected expansion domain as the final domain.

The controller 150 controls overall operations of each configuration of the voice recognition apparatus 100. Especially, the controller 150 may control the communicator 110 to transmit information on the pre-extracted first and second utterance elements on the final domain determined through the determiner 140. Therefore, the external device may generate response information related to the user's utterance voice within the predetermined final domain and transmit the generated response information to the voice recognition apparatus 100, and the controller 150 may transmit the response information received from the external device to the display apparatus 200 through the communicator 110. However, the present disclosure is not limited thereto, and the controller 150 may itself generate response information on the user's utterance voice based on the pre-extracted first and second utterance elements within the final domain determined by the domain determiner 140 and transmit the generated response information to the display apparatus 200.

Figure 3:
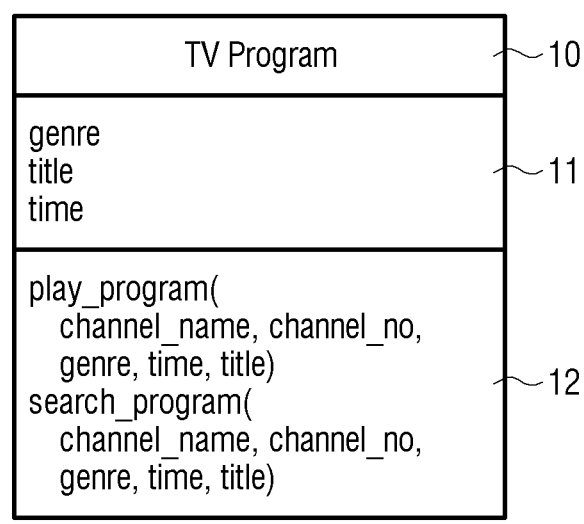
FIG. 3 is a view of a hierarchical domain model for detecting a candidate domain according to an exemplary embodiment.

The hierarchical domain model, predetermined and stored in the storage unit 160, may consist of a hierarchical structure as in FIG. 3.

FIG. 3 is an exemplary view of a hierarchical domain model for detecting a candidate domain according to an exemplary embodiment.

As illustrated in FIG. 3, the hierarchical domain model for detecting a candidate domain consists of a standardized hierarchy structure showing the relationship between the user's intention and the processable domain. The hierarchical domain model may consist of a hierarchy structure having a tree shape including an uppermost hierarchy level, middle hierarchy level, and lowermost hierarchy level etc. The uppermost hierarchy level is a theme node corresponding to the virtual expansion domain predetermined as the uppermost concept corresponding to the candidate domain, which is the area generating response information on the user's utterance voice. The middle hierarchy level is a theme node regarding the virtual expansion domain predetermined as the subordinate concept to the uppermost concept. In addition, the lowermost hierarchy level is a theme node corresponding to the candidate domain predetermined as the subordinate concept to the middle concept.

For example, as illustrated in FIG. 3, at the lowermost hierarchy level, each candidate domain, TV program 10, VOD 20 and TV device 30 may be predetermined. In such a case, at the middle hierarchy level, an expansion domain (TV channel 40), which is the middle concept of each of the candidate domains (TV program 10 and TV device 30), and an expansion domain (Video Content 50), which is the middle concept of each of the candidate domains (TV program 10 and VOD 20) may be predetermined.

That is, in the lower most hierarchy level of the hierarchical domain model, a candidate domain for determining an area for generating response information on each utterance voice of the user may be predetermined, and in the middle hierarchy level, an expansion domain of a middle concept which includes at least two candidate domains from among the candidate domains predetermined as the lowermost concept may be predetermined. In addition, in the uppermost hierarchy level, an expansion domain of an uppermost concept including all candidate domains predetermined as the lowermost concept may be predetermined. Each domain predetermined per hierarchy, as mentioned above, may be predetermined as a main action for determining each domain and each component slot per main action matches each other as in FIG. 4.

Figure 4:
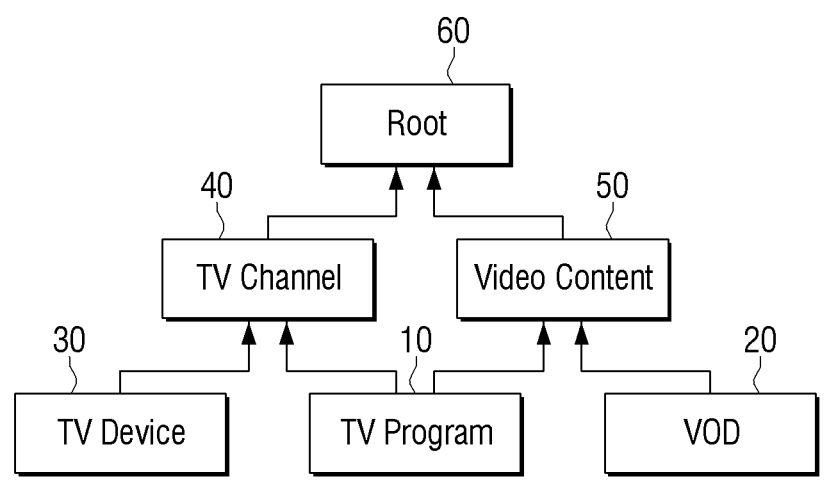
FIG. 4 is a view illustrating a main action predetermined in a domain belonging to a hierarchical domain model and component slot per main action, according to an exemplary embodiment.
Figure 5:
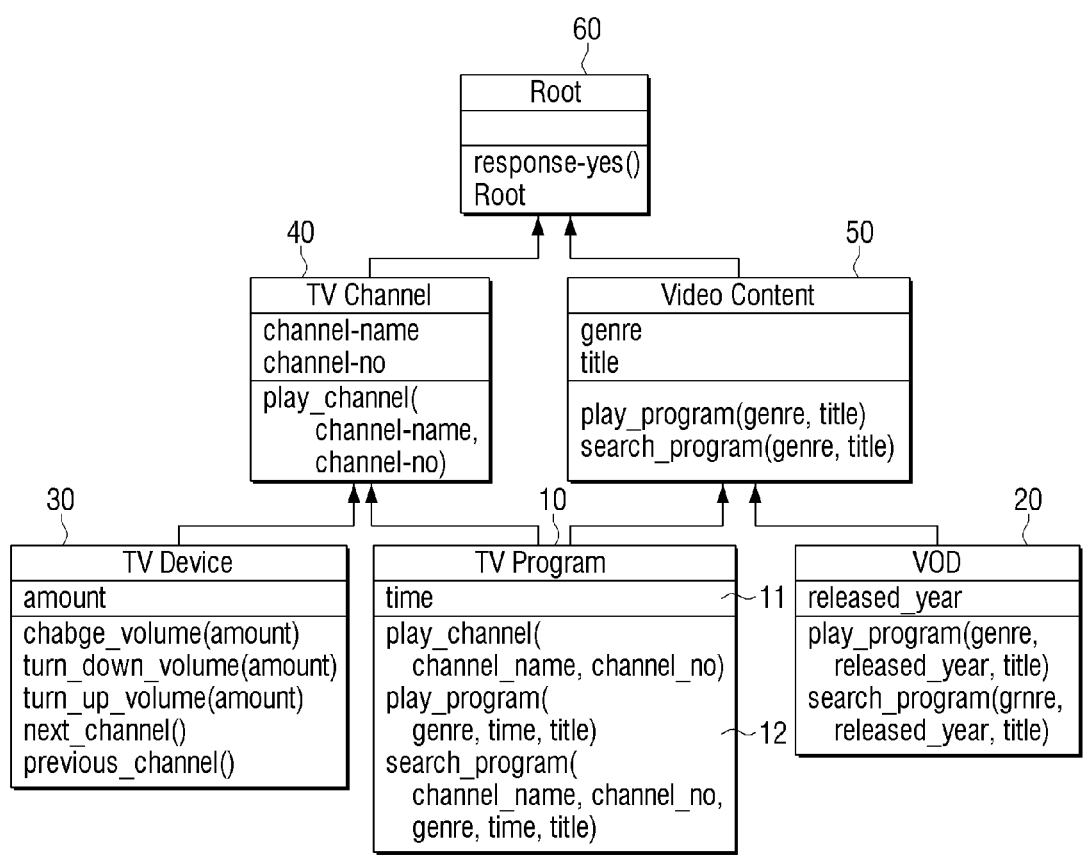
FIG. 5 is a view illustrating a main action predetermined in all domains belonging to a hierarchical domain model and a component slot per main action, according to an exemplary embodiment.

FIG. 4 is an exemplary view illustrating a main action predetermined in the domain included in the hierarchical domain model and a component slot per main action according to an exemplary embodiment, and FIG. 5 is an exemplary view illustrating a main action predetermined in all the domains included in the hierarchical domain model and a component slot per main action according to an exemplary embodiment.

As illustrated in FIG. 4, for example, the domain regarding the TV program 10 may be a candidate domain predetermined in the lowermost hierarchy level as explained in FIG. 3 above. The candidate domain regarding the TV program 10 may include the component slot 11 corresponding to the second utterance element representing the object. Furthermore, the candidate domain regarding the TV program 10 may include a user action script 12 where the main action corresponding to the first utterance element regarding the user action and the component slot 11 are matched to each other. As illustrated, the candidate domain regarding the TV program 10 may include a user action script 12 such as "play_program(channel_name, channel_no, genre, time, title)", "search_program(channel_name, channel_no, genre, time, title)". Therefore, each domain per hierarchy included in the hierarchical domain model may include a user action script generated by combining different main actions and a component slot per main action.

Thus, the domain determiner 140 may detect at least one candidate domain which includes a user action script where a main action and a component slot corresponding to the first utterance element and second utterance element respectively, extracted from the extractor 130, are matched to each other based on such a predetermined hierarchical domain model. For example, with reference to FIG. 5, the extractor 130 may extract the first utterance element "show me!" and the second utterance element "(title of broadcasting program)" from the text regarding the utterance voice "show me (title of broadcasting program)".

In this case, the domain determiner 140 determines whether or not the user action script generated by combining the main action corresponding to the first utterance element "show me!" and the component slot corresponding to the second utterance element "(title of broadcasting program)" exists in the expansion domain. In the aforementioned example, the main action corresponding to the first utterance element "show me!" may be "play_program", and the component slot corresponding to the second utterance element "(title of broadcasting program)" may be the "title". Therefore, the user action script corresponding to the "show me (title of broadcasting program)" may be "play_program (title)". Therefore, the domain determiner 140 determines whether or not the user action script is included in the expansion domain. When it is determined that the user action script regarding "play_program(title)" is included in the expansion domain of the middle hierarchy, the domain determiner 140 may detect the domain Video Content (50) as the expansion domain.

When an expansion domain related to the first and second utterance elements extracted from the user's utterance voice is not detected, the domain determiner 140 may detect the candidate domain related to the first and second utterance elements.

For example, the extractor 130 may extract the first utterance element "find me!" and second utterance elements "action movie" and "right now" from the text corresponding to the utterance voice "find me an action movie on air right now". When the first and second utterance elements are extracted, the domain determiner 140 determines whether or not the user action script generated by combining the main action corresponding to the first utterance element "find me" and component slots corresponding to each second utterance element "right now" and "action movie" corresponding to the first utterance element exists in the expansion domain. In the aforementioned example, the main action corresponding to the first utterance element may be "search_program", and component slots corresponding to each second utterance element "right now" and "action movie" may be "time" and "genre", respectively. Therefore, the user action script corresponding to "find me an action movie on air right now" may be "search_program(time, genre)".

Therefore, the domain determiner 140 determines whether or not such a user action script is included in the expansion domain. When it is determined that the user action script regarding "search_program(time, genre)" is not included in the expansion domain, the domain determiner 140 may detect a candidate domain including "search_program(time, genre)", corresponding to the user action script, included in a plurality of candidate domains belonging to the lowermost hierarchy. When the candidate domain including "search_program(time, genre)" is a TV program 10, the domain determiner 140 may detect the domain TV program 10 as the candidate domain.

When the candidate domain is detected, the domain determiner 140 may determine whether or not to determine the detected candidate domain as the final domain based on the previous domain. When detecting the expansion domain based on the main action and the component slot corresponding to the first utterance element and second utterance element respectively, extracted from the user's utterance voice, it is possible to detect the expansion domain by classifying the domain per hierarchy level belonging to the hierarchical domain model as in FIGS. 6 and 7.

Figure 6:
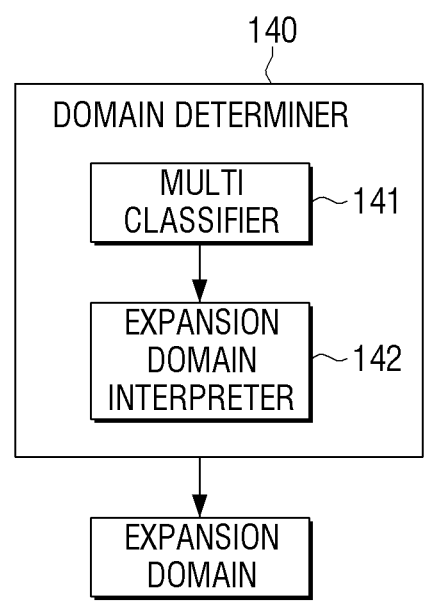
FIG. 6 is a first view classifying a domain per hierarchy belonging to a hierarchical domain model in a domain determiner, according to an exemplary embodiment.

FIG. 6 is a first exemplary view which classifies the domain per hierarchy level, belonging to the hierarchical domain model, in the domain determiner according to an exemplary embodiment.

As illustrated in FIG. 6, the domain determiner 140 may include a multi classifier 141 and an expansion domain interpreter 142. The multi classifier 141 recognizes the user's utterance voice per hierarchy level, belonging to the hierarchical domain model, and detects at least one candidate domain related to the first and second utterance elements extracted from the converted text. In addition, the expansion domain interpreter 142 determines the domain belonging to the superior concept of the candidate domain detected from the multi classifier 141 as the expansion domain.

As in the aforementioned example, when the first utterance element "find me!" and the second utterance element "action movie" are extracted from the user's utterance voice "find me an action movie!", the multi classifier 141 may detect the candidate domain belonging to the lowermost hierarchy level, TV program 10 and VOD 20, which include the user action script generated by combining the main action corresponding to the first utterance element and the component slot corresponding to the second utterance element. As mentioned above, when the candidate domains, TV program 10 and VOD 20 are detected, the expansion domain interpreter 142 determines whether or not there is an expansion domain having a superior concept with each candidate domain, TV program 10 and VOD 10. When it is determined that each candidate domain of TV program 10 and VOD 20 consists of a hierarchy with the common superior concept with a domain "Video Content 50", the expansion domain interpreter 142 may determine the domain "Video Content 50" as the expansion domain.

Figure 7:
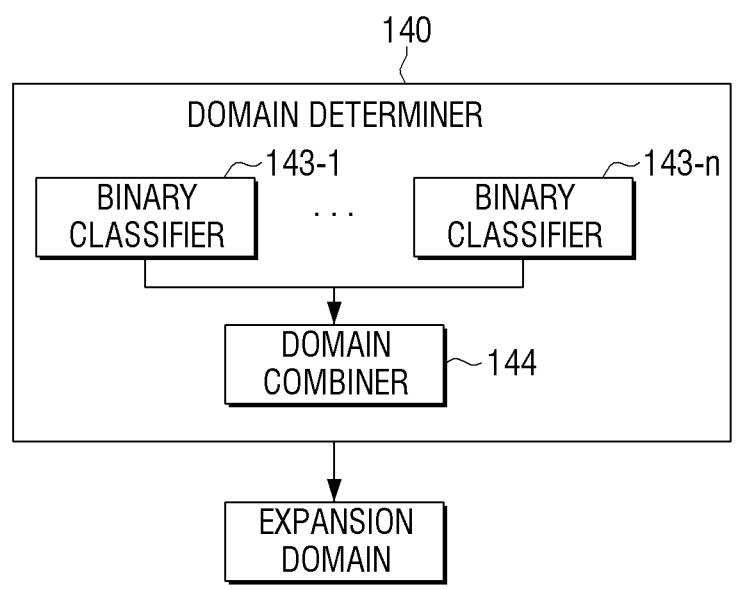
FIG. 7 is a second view classifying a domain per hierarchy belonging to a hierarchical domain model in a domain determiner, according to an exemplary embodiment.

FIG. 7 is a second exemplary view classifying the domain per hierarchy belonging to the hierarchical domain model in the domain determiner according to another exemplary embodiment.

As illustrated in FIG. 7, the domain determiner 140 may include a binary classifier 143 and a domain combiner 144. There may be as many number of binary classifiers as the candidate domains in the lowermost hierarchy level belonging to the hierarchical domain model. That is, when the number of candidate domains of the lowermost hierarchy level, belonging to the hierarchical domain model, is n, the domain determiner 140 may include binary classifiers 143-1-143-n. Therefore, the binary classifiers 143-1-143-n corresponding to the candidate domain of the lowermost hierarchy level, belonging to the hierarchical domain model, may detect the candidate domain related to the first utterance element and second utterance element extracted from the user's utterance voice and the domain of the superior hierarchy level corresponding to the candidate domain. Therefore, the domain combiner 144 may combine the domains detected through each binary classifier 143-1-143-*n* and determine the candidate domain.

For example, when the first utterance element "find me!" and the second utterance element "action movie" are extracted from the user's utterance voice "find me an action movie!", only the binary classifier 143-2 and 143-3, corresponding to the candidate domain TV program 10 and VOD 20 including the user action script generated by combining the main action corresponding to the first utterance element "find me!" and the component slot corresponding to the second utterance element "action movie", may detect the domain per hierarchy level.

That is, it is possible to detect the candidate domain regarding the TV program 10 of the lowermost hierarchy level, the expansion domain corresponding to the TV channel 40, video channel 50 having a middle hierarchy consisting of a superior concept and the expansion domain corresponding to the root 60 of the uppermost hierarchy including the user action script generated by combining the main action corresponding to the first utterance element "find me!" and the component slot corresponding to the second utterance element. In addition, the binary classifier 143-3 may detect the candidate domain regarding the VOD 20 of the lowermost hierarchy, the expansion domain corresponding to the video channel 50 of the middle hierarchy consisting of the superior concept and the expansion domain corresponding to the root 60 of the uppermost hierarchy including the user action script generated by combining the main action corresponding to the first utterance element "find me!" and the component slot corresponding to the second utterance element. As such, when the domain per hierarchy is detected through the binary classifier 143-1, 2, . . ., the domain combiner 144 may determine the repeated domain of the detected domains as the expansion domain.

Accordingly, when the expansion domain related to the first and second utterance elements extracted from the user's utterance voice is detected, the domain determiner 140 may detect all domains of subordinate concept related to the pre-detected expansion domain based on the previously determined domain (hereinabove referred to as domain), and determine at least one candidate domain of all candidate domains detected as the final domain.

In addition, the domain determiner 140 may understand the user's intention from at least one of the first and second utterance elements corresponding to the user's utterance voice extracted from the extractor 130 and the pre-detected candidate domain. For example, when the second utterance elements "right now" and "action movie" are detected from the user's utterance voice "find me an action movie on air right now", the domain determiner 140 may understand the user's intention from the component slot corresponding to the second utterance elements "right now" and "action movie".

As such, when the user's intention is understood, the domain determiner 140 determines whether or not a context initialization has occurred from the understood user's intention. When it is determined that a context initialization has not occurred, the domain determiner 140 may determine at least one candidate domain of a plurality of candidate domains pre-detected as the final domain based on the previous domain, the previous domain being the domain determined from the user's previous utterance voice right before receiving the user's utterance voice.

More specifically, when at least one candidate domain of a plurality of pre-detected candidate domains correspond to the previous domain pre-stored in the storage unit 160, the domain determiner 140 may determine the previous domain as the final domain. Herein, the previous domain is the domain determined from the user's previous utterance voice right before receiving the user's utterance voice. Such a previous domain may be a TV program 10, and the currently detected candidate domains may be a TV program 10 and VOD 20. In this case, the domain determiner 140 determines that the current user's utterance voice is being input within the category related to the previous utterance voice. Therefore, the domain determiner 140 does not determine the candidate domain as the final domain, but may maintain the TV program 10, which is the previous domain, as the final domain.

However, the present disclosure is not limited thereto, and the domain determiner 140 may determine the candidate domain corresponding to the previous domain of the pre-detected plurality of candidate domains as the final domain.

When it is determined that the pre-detected plurality of candidate domains are different from the previous domain or a context initialization has occurred, the domain determiner 140 determines the candidate domain related to the first utterance element representing the user action from among at least one candidate domains related to the pre-detected expansion as the final domain. More specifically, the domain determiner 140 determines the candidate domain including the main action information corresponding to the first utterance element representing the user action from among the detected plurality of candidate domains as the final domain. Herein, when all main action information corresponding to the first utterance element representing the user action is included in the detected plurality of candidate domains, the domain determiner 140 may determine all pre-detected domains as the final domain.

For example, when the pre-detected expansion domain is an expansion domain regarding video content, the candidate domain regarding the expansion domain regarding the video content may be a domain regarding the TV program and VOD. The previous domain determined based on the previous utterance voice may be the TV program and VOD. That is, when the currently detected candidate domain and previous domain all correspond, the domain determiner 140 may determine the domain correspond to the TV program and VOD which is the previous domain as the final domain. When the candidate domain is a domain correspond to the TV program and VOD, and the previous domain is a domain correspond to the VOD, the domain determiner 140 may determine the VOD domain which is the previous domain as the final domain.

The candidate domain may be the domain correspond to the TV program and VOD, and the previous domain may be the domain correspond the TV apparatus. That is, when the detected candidate domain and the previous domain are different from each other, the domain determiner 140 determines that a domain conversion has occurred. Therefore, the domain determiner 140 may determine the candidate domain including the main action information corresponding to the first utterance element representing the user action from among the first and second utterance elements extracted from the user's utterance voice as the final domain.

For example, when the detected candidate domain is a domain related to a TV program and VOD, and the main action information corresponding to the first utterance element extracted from the user's utterance voice is a "search_program" searching contents, the domain determiner 140 determines whether or not the detected candidate domains includes the main action information. When the main action information "search_program" is included in a candidate domain corresponding to the TV program and VOD, the domain determiner 140 may determine all pre-detected candidate domains, that is, the domains related to the TV program and VOD as the final domain.

When the pre-detected plurality of candidate domains include the main action information corresponding to the first utterance element extracted from the user's utterance voice, the domain determiner 140 may determine the candidate domain selected by the user from among the detected plurality of candidate domains as the final domain or arbitrarily select one candidate domain from among the plurality of candidate domains and determine that as the final domain.

For example, the pre-detected candidate domain may be a domain related to a TV program and VOD, and the main action information corresponding to the first utterance element extracted from the user's utterance voice may be specific contents "play_program". In this case, when the TV program and VOD related domains are all selected as the final domain and different response information may be generated regarding the user's utterance voice. That is, the response information generated in response to the user's utterance voice within the candidate domain corresponding to the TV program and the response information generated in response to the user's utterance voice within the candidate domain corresponding to the VOD may be different from each other. Therefore, the domain determiner 140 may determine one of the two selected by the user from among the TV program and VOD as the final domain.

There may be a plurality of previous domains, and one previous domain from among the plurality of previous domains and one candidate domain from among the pre-detected plurality of candidate domains may correspond to each other. In this case, the domain determiner 140 determines whether or not the candidate domain corresponding to the previous domain includes main action information corresponding to the first utterance element. When it is determined that the candidate domain corresponding to the previous domain includes the main action information corresponding to the first utterance element, the domain determiner 140 may determine the candidate domain corresponding to the previous domain as the final domain.

When one candidate domain, from among the pre-detected plurality of candidate domains, is determined as the final domain, the controller 150 may transmit information regarding the first and second utterance elements extracted from the user's utterance voice and information regarding the predetermined final domain to the external apparatus (not illustrated) through the communicator 110. Therefore, the external apparatus (not illustrated) generates response information related to the user's utterance voice within the predetermined final domain and transmits the generated response information to the voice recognition apparatus 100. Accordingly, the controller 150 may transmit the response information received from the external apparatus to the display apparatus 200 through the communicator 110. However, the present disclosure is not limited thereto, and when the final domain is determined through the domain determiner 140, the controller 150 may itself generate response information on the user's utterance voice based on the first and second utterance elements pre-extracted within that determined final domain, and transmit the generated response information to the display apparatus 200 through the communicator 110.

Herein, the response information includes response message information corresponding to the user's utterance voice. Therefore, the controller 150 may receive response information including the response message information in a text format, being output on the display apparatus 200, from the external apparatus or generate the response information internally. When such response information is received from the external apparatus or generated internally, the controller 150 transmits the response information to the display apparatus 200 through the communicator 110. Accordingly, the display apparatus 200 may output the response message information, included in the response information received from the voice recognition apparatus 100, on the screen in a text format or output as audio through the speaker.

A detailed explanation was provided above on each configuration of the voice recognition apparatus 100 providing response information to the user's utterance voice in a dialogue type system according to the exemplary embodiments. A detailed explanation on a method of providing response information corresponding to the user's utterance voice in a dialogue type voice recognition apparatus 100 according to exemplary embodiments will be provided below.

Figure 8:
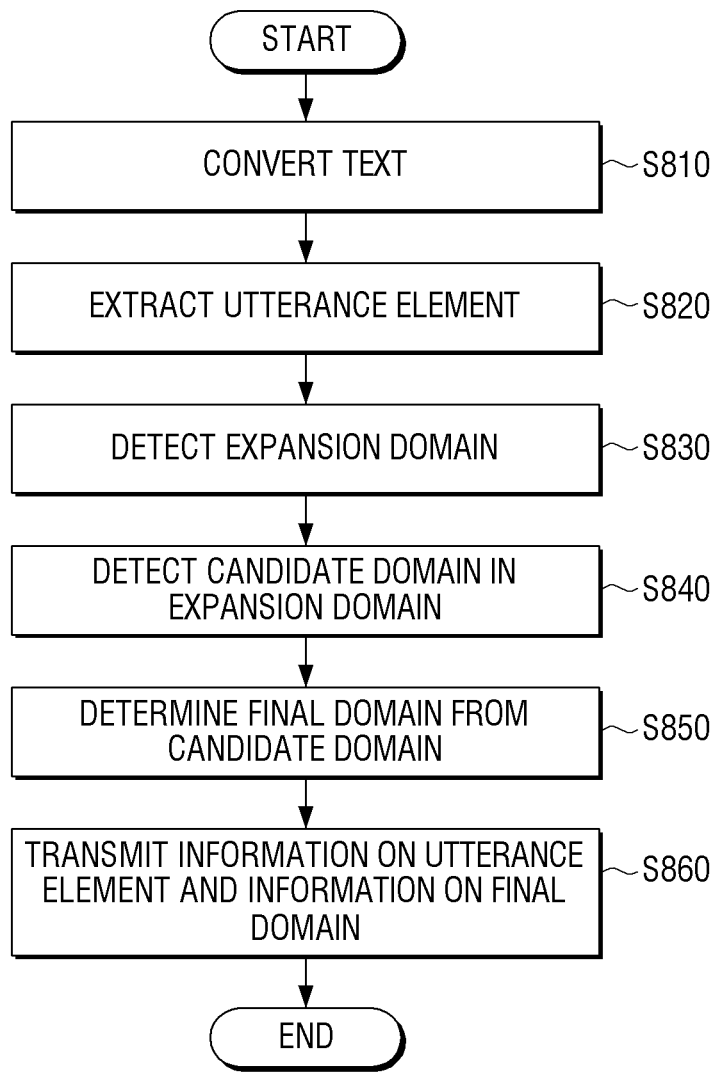
FIG. 8 is a flowchart of a method for providing response information in response to an utterance voice of a user in a voice recognition apparatus of a dialogue type system, according to an exemplary embodiment.

FIG. 8 is a flowchart of a method for providing response information corresponding to the user's utterance voice in a voice recognition apparatus of a dialogue type system according to an exemplary embodiment.

As illustrated in FIG. 8, the voice recognition apparatus 100 receives a user's utterance voice signal (hereinafter referred to as an "utterance voice") collected from the display apparatus 200. When the user's utterance voice is received from the display apparatus 200, the received user's utterance voice is recognized and converted into a text (S810). According to an exemplary embodiments, the voice recognition apparatus 100 may use an STT (Speech to Text) algorithm and convert the user's received utterance voice into text. When the user's utterance voice is converted into text, the voice recognition apparatus 100 extracts the first utterance element representing the user action and the second utterance element representing the object from the user's utterance voice converted into text (S820). For example, in the case of the user's utterance voice "find me an action movie!", the voice recognition apparatus 100 may extract the first utterance element representing the user action "find me!" and the second utterance element representing the object "action movie".

Next, the voice recognition apparatus 100 detects the expansion domain related to the first and second utterance elements extracted from the user's utterance voice based on the hierarchical domain model predetermined and stored (S830). Herein, the hierarchical domain model is a domain model hierarchically consisting of a candidate domain where the main action corresponding to the first utterance element extracted per utterance voice and the component slot corresponding to the second utterance element are matched to each other, and a virtual expansion domain predetermined as a superior concept of each candidate domain.

The hierarchical domain model may consist of a tree shaped hierarchical structure including an uppermost hierarchy level, a middle hierarchy level and a lowermost hierarchy level. The uppermost hierarchy level is a theme node regarding the virtual expansion domain predetermined as an uppermost concept related to the candidate domain which is an area generating the response information on the user's utterance voice, and the middle hierarchy level is a theme node predetermined as a subordinate concept of the uppermost concept. In addition, the lowermost hierarchy level is a theme node regarding the candidate domain predetermined as a subordinate concept of the middle concept. That is, the candidate domain belonging to the lowermost hierarchy level of the hierarchical domain model is predetermined as a candidate domain of the lowermost concept corresponding to a basic keyword, and the virtual expansion domain belonging to the middle hierarchy level may be predetermined as a domain of a middle concept including two or more candidate domains from among the plurality of candidate domains predetermined as a lowermost concept. In addition, the virtual expansion domain belonging to the uppermost hierarchy level may be determined as a domain of an uppermost concept including all candidate domains predetermined as a lowermost concept.

Each domain predetermined per hierarchy level may be predetermined as the main action for determining each domain and the component slot are matched to each other as illustrated in FIG. 4. That is, each domain predetermined per hierarchy may include the user action script generated by combining the main action corresponding to the first utterance element representing the user action and the second utterance element representing the object. As illustrated in FIG. 4, the candidate domain regarding the TV program 10 belonging to the lowermost hierarchy may include the user action script 12 such as "play_program(channel_name, channel_no, genre, time, title)", "search_program(channel_name, channel_no, genre, title)". Therefore, as illustrated in FIG. 4, each domain predetermined per hierarchy, that is each domain per hierarchy included in the hierarchical domain model may include the user action script generated by combining a different main action and component slot per main action as illustrated in FIG. 5.

Therefore, the voice recognition apparatus 100 may detect at least one candidate domain including the user action script, generated by combining the main action and the component slot corresponding to the first utterance element and second utterance element, respectively, extracted from the user's utterance voice based on the predetermined hierarchical domain model, and detect the expansion domain belonging to the superior concept of the corresponding candidate domain from the detected candidate domains.

According to an exemplary embodiment, the voice recognition apparatus 100 uses the multi classifier to detect at least one candidate domain related to the first and second utterance elements extracted from the user's utterance voice per hierarchy belonging to the hierarchical domain model. When at least one candidate domain is detected as such, the voice recognition apparatus 100 determines the domain belonging to the superior concept of the detected candidate domain as the expansion domain. For example, the voice recognition apparatus 100 may detect the candidate domain TV program 10 and VOD 20 including "search_program (genre)" which is the user action script generated by combining the main action corresponding to the first utterance element "find me!" and component slot corresponding to the second utterance element "action movie" from the user's utterance voice. As such, when each candidate domain (TV program 10 and VOD 20) is detected, the voice recognition apparatus 100 determines whether or not there is an expansion domain having a superior concept common with each of the detected candidate domain. When it is determined that each of the candidate domain TV program 10 and VOD 20 consists of a hierarchy having a common superior concept with the domain "Video Content(50)", the voice recognition apparatus 100 may determine the domain "Video Content (50)" as the expansion domain.

According to another exemplary embodiment, the voice recognition apparatus 100 uses at least one binary classifier to detect at least one domain, from among the candidate domains, related to the first utterance element and the second utterance elements extracted from the user's utterance voice and the expansion domain. Herein, the number of binary classifiers may be as many as the number of candidate domains in the lowermost hierarchy level belonging to the hierarchical domain model. That is, when there is n number of candidate domains in the lowermost hierarchy level belonging to the hierarchical domain model, the voice recognition apparatus 100 uses n number of binary classifiers to detect the candidate domain related to the first and second utterance elements extracted from the user's utterance voice and the expansion domain of the superior hierarchy level related to the corresponding candidate domain. Next, the voice recognition apparatus 100 may determine the candidate domain by combining the domains detected through each binary classifier. For example, when the first utterance element "find me!" and the second utterance element "action movie" are extracted from the user's utterance voice, only the binary classifier corresponding to the candidate domains TV program and VOD including the user action script generated by combining the main action corresponding to the first utterance element "find me!" and the component slot corresponding to the second utterance element "action movie", from among each binary classifier corresponding to the TV program, VOD and TV device, may detect the domain per hierarchy.

That is, the voice recognition apparatus 100 may detect the candidate domain corresponding to the TV program 10 of the lowermost hierarchy level including the user action script generated by combining the main action corresponding to the first utterance element "find me!" and the component slot corresponding to the second utterance element "action movie", the expansion domain corresponding to the TV channel and video content in the middle hierarchy level of the superior concept incorporating the corresponding candidate domain, and the expansion domain corresponding to the root in the uppermost hierarchy level. In addition, the voice recognition apparatus 100 may detect the candidate domain regarding the VOD in the lowermost hierarchy level including the user action script generated by combining the main action corresponding to the first utterance element "find me!" and the component slot corresponding to the second utterance element "action movie", the expansion domain corresponding the video channel in the middle hierarchy level consisting of a superior concept incorporating the corresponding candidate domain, and the expansion domain corresponding to the root of the uppermost hierarchy level. As such, when the domain per hierarchy is detected through the binary classifier corresponding to each candidate domain TV program and VOD, the voice recognition apparatus 100 may determine the repeated domain from among the detected domains as the expansion domain.

When the expansion domain related to the first and second utterance elements extracted from the user's utterance voice is detected, the voice recognition apparatus 100 may detect all candidate domains of a subordinate concept related to the pre-detected candidate domain based on the previously determined domain (herein below referred to as the previous domain) and detect at least one of the plurality of detected candidate domains as the final domain (S840, S850). Next, the voice recognition apparatus 100 transmits the information regarding the determined final domain and the information regarding the first and second utterance elements extracted from the user's utterance voice to the external apparatus (not illustrated) (S860). Accordingly, the external apparatus (not illustrated) may generate response information related to the user's utterance voice within the predetermined final domain and transmit the generated response information to the voice recognition apparatus 100. However, the present disclosure is not limited thereto and the voice recognition apparatus 100 may itself generate the response information on the user's utterance voice based on the first and second utterance elements extracted within the predetermined final domain. Herein, the response information may include a response message information corresponding to the user's utterance voice. Therefore, when such response information is received from the external apparatus or generated internally, the voice recognition apparatus 100 transmits the corresponding response information to the display apparatus 200. Accordingly, the display apparatus 200 may output the response message information included in the response information received from the voice recognition apparatus 100 on the screen in a text format or output as audio through the speaker.

Herein below is a detailed explanation of a method for determining at least one candidate domain from among the plurality of candidate domains as the final domain in the aforementioned voice recognition apparatus 100.

Figure 9:
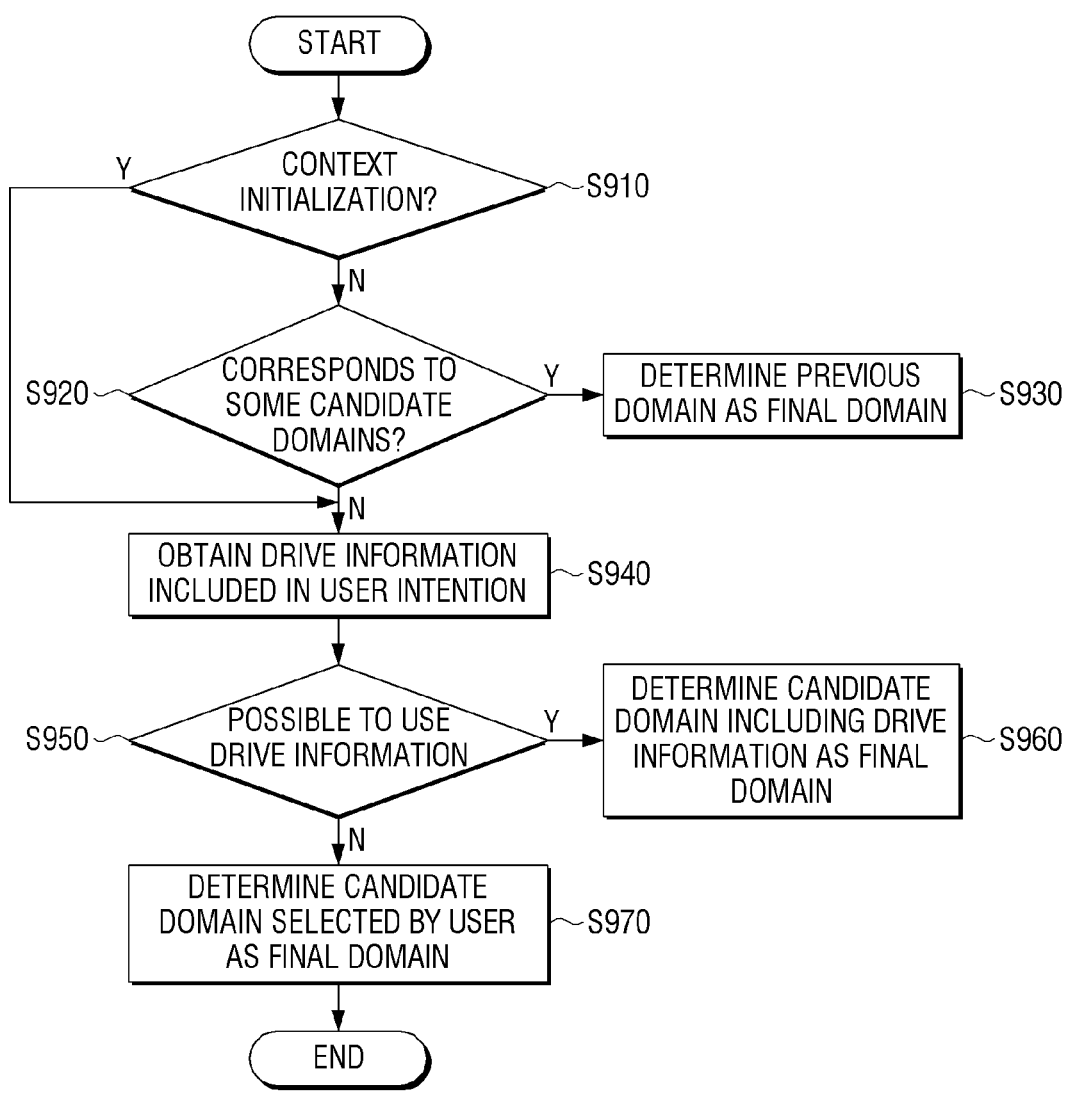
FIG. 9 is a flowchart of a method for determining a final domain from among candidate domains detected in a voice recognition apparatus, according to an exemplary embodiment.

FIG. 9 is a flowchart of a method for determining one of the candidate domains extracted in the voice recognition apparatus as the final domain according to an exemplary embodiment.

As illustrated in FIG. 9, the voice recognition apparatus 100 understands the user's intention from the first and second utterance elements extracted in operation S820 and the pre-detected candidate domain. As mentioned before, when the second utterance elements "right now" and "action movie" are detected from the user's utterance voice "find me an action movie on air right now", the voice recognition apparatus 100 may understand the user's intention from the detected component slots "right now" and "action movie".

When the user's intention is understood, the voice recognition apparatus 100 determines whether or not a context initialization occurred based on the understood user's intention (S910). When it is determined that a context initialization has not occurred, the voice recognition apparatus 100 determines one candidate domain from among the pre-detected plurality of candidate domains as the final domain based on the previous domain. More specifically, when the one candidate domain from among the pre-detected plurality of candidate domains correspond to the pre-stored previous domain, the voice recognition apparatus 100 maintains the previous domain as the final domain (S920, S930). Herein, the previous domain is the domain determined from the user's previous utterance voice right before receiving the user's utterance voice. For Example, when such a previous domain is a TV program and the currently detected candidate domain is TV program and VOD, the voice recognition apparatus 100 determines that the user's current utterance voice is being input within the category related to the previous utterance voice. Therefore, the voice recognition apparatus 100 does not determine the pre-detected plurality of candidate domains as the final domain, but may maintain the TV program, which is the previous domain, as the final domain.

When it is determined that the pre-detected plurality of candidate domains are different from the previous domain or a context initialization has occurred, the voice recognition apparatus 100 obtains main action information corresponding to the first utterance element representing the user intention (S940). Next, the voice recognition apparatus 100 determines whether or not main action information corresponding to the first utterance element is included in the pre-detected plurality of candidate domains (S950). When it is determined that main action information corresponding to the first utterance element is included in the at least one candidate domain of among the plurality of candidate domains, the voice recognition apparatus 100 determines the candidate domain including the main action information, corresponding to the first utterance element, as the final domain (S960).

There may be a plurality of previous domains, and one previous domain from among the plurality of previous domains and one candidate domain from among the pre-detected plurality of candidate domains may correspond to each other. In this case, the voice recognition apparatus 100 determines whether or not the candidate domain corresponding to the previous domain includes the main action information corresponding to the first utterance element. When it is determined that the candidate domain corresponding to the previous domain includes the main action information corresponding to the first utterance element, the voice recognition apparatus 100 may determine the candidate domain corresponding to the previous domain as the final domain.

For example, when the detected candidate domain is a domain regarding a TV program and VOD, and the main action information corresponding to the first utterance element extracted from the user's utterance voice is "search_program" for searching contents, the voice recognition apparatus 100 determines whether or not the detected candidate domain includes the main action information "search_program". When the candidate domain regarding the TV program and VOD includes the main action information "search_program", the voice recognition apparatus 100 may determine the candidate domain regarding the TV program and VOD as the final domain.

When it is determined that all of the pre-detected plurality of candidate domains do not include the main action information, the voice recognition apparatus 100 may determine the candidate domain selected by the user from among the detected plurality of candidate domains as the final domain (S970) or arbitrarily select one candidate domain of among the plurality of candidate domains and determine that as the final domain.

For example, the pre-detected candidate domain may be a domain related to a TV program and VOD, and the main action information corresponding to the first utterance element extracted from the user's utterance voice may be "play_program". In this case, when the candidate domain regarding the TV program and VOD is selected as the final domain, different response information may be generated regarding the user's utterance voice. Therefore, the voice recognition apparatus 100 may determine one candidate domain selected by the user of among the candidate domains regarding the TV program and VOD as the final domain.

As such, when at least one candidate domain from among the pre-detected plurality of candidate domains is determined as the final domain, the voice recognition apparatus 100 may generate the response information on the user's utterance voice within the determined final domain and output the generated response information. Accordingly, the display apparatus 200 may confirm the response message regarding the utterance voice of oneself by displaying the response information received from the voice recognition apparatus 100 or by outputting through the speaker.

The method of providing response information on the user's utterance voice in the voice recognition apparatus according to various exemplary embodiments may be embodied as a program code and be provided in each server or device stored in a non-transitory computer readable medium.

A non-transitory computer readable medium is a computer readable medium where data may be stored semi-permanently and not a medium where data is stored for a short period of time such as a resistor, cache, memory, etc. More specifically, the aforementioned various applications or programs may be stored in a non-transitory computer readable medium such as a CD, DVD, hard disk, Blu-ray, USB, memory card, ROM, etc.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. A dialogue type voice recognition apparatus comprising:
a communicator which is configured to perform communication with an external apparatus; and
at least one hardware processor configured to execute voice recognition of the dialogue type voice recognition apparatus to:
convert a user's utterance voice signal into text;
extract a first utterance element representing a user action and a second utterance element representing an object from the text of the user's utterance voice signal,
detect an expansion domain, being related to the extracted first utterance element and second utterance element, in a hierarchical domain model, when a user action script, comprising a main action corresponding to the first utterance element and a component slot corresponding to the second utterance element, is included in the expansion domain, wherein the hierarchical domain model comprises a plurality of candidate domains of a lowermost concept and the expansion domain, including at least two candidate domains, of an uppermost concept,
detect at least one candidate domain related to the detected expansion domain when the user action script is included in the candidate domain,
determine the at least one candidate domain related to the detected expansion domain as a final domain,
detect a candidate domain, when the user action script is included in the candidate domain and the expansion domain is not detected,
control the communicator to transmit information regarding the first and second utterance elements and information regarding the determined final domain as a result of the voice recognition of the dialogue type voice recognition apparatus, to an external apparatus, and
control the communicator to receive response information related to the first and second utterance elements within the determined final domain from the external apparatus.

2. The dialogue type voice recognition apparatus according to claim 1, where in the at least one hardware processor is configured to:
detect at least one candidate domain including the user action script, and
determine a domain as the expansion domain when two or more of the detected candidate domains comprise a hierarchy with the domain as a common superior concept.

3. The dialogue type voice recognition apparatus according to claim 1, wherein the at least one hardware processor is configured to:
use a multi classifier to detect a subordinate candidate domain related to the detected expansion domain, where the main action corresponding to the first utterance element and the component slot corresponding to the extracted second utterance element are matched to each other is detected, and
detect a candidate domain where the main action corresponding to the first utterance element and the component slot corresponding to the second utterance element matched to each other, when the expansion domain is not detected.

4. The dialogue type voice recognition apparatus according to claim 1, wherein the at least one hardware processor is configured to use at least one binary classifier to detect at least one domain from among the candidate domains, where the main action corresponding to the first utterance element and the component slot corresponding to the second utterance element are matched to each other, and the expansion domain.

5. The dialogue type voice recognition apparatus according to claim 3, wherein the at least one hardware processor is configured to:
determine a user's intention from at least one of the extracted first and second utterance elements and the detected candidate domain to determine whether or not a context initialization occurred, and
when it is determined that the context initialization has not occurred, determine at least one candidate domain from among the detected candidate domains as the final domain based on a previous domain, the previous domain being a domain determined from a user's previous utterance voice before receiving the text of the user's utterance voice signal.

6. The dialogue type voice recognition apparatus according to claim 5, wherein the at least one hardware processor is configured to determine the previous domain as the final domain in response to one candidate domain from among the detected candidate domains and the previous domain corresponding to each other.

7. The dialogue type voice recognition apparatus according to claim 6, wherein the at least one hardware processor is configured to determine the candidate domain, related to the first utterance element representing the user action, from among the at least one candidate domain related to the detected expansion domain, as the final domain, in response to determining that the detected candidate domain and the previous domain are different from each other or the context initialization has occurred.

8. The dialogue type voice recognition apparatus according to claim 7, wherein the at least one hardware processor is configured to determine all the detected candidate domains as the final domain in response to the detected candidate domain including main action information corresponding to the first utterance element representing the user action.

9. The dialogue type voice recognition apparatus according to claim 8, wherein the at least one hardware processor is configured to determine the candidate domain selected by a user as the final domain or arbitrarily select one candidate domain from among the detected candidate domains as the final domain, in response to the detected candidate domain including the main action information corresponding to the first utterance element representing the user action.

10. The dialogue type voice recognition apparatus according to claim 7, wherein the at least one hardware processor is configured to determine the candidate domain corresponding to the previous domain from among the detected candidate domains as the final domain, in response to there being a plurality of previous domains, one of the plurality of previous domains and one of the candidate domains corresponding to each other, and the candidate domain including main action information corresponding to the first utterance element representing the user action.

11. A method of performing voice recognition for providing response information corresponding to a user's utterance voice in a dialogue type voice recognition apparatus, implemented by at least one hardware processor, the method comprising:
converting a user's utterance voice signal into text;
extracting a first utterance element representing a user action and a second utterance element representing an object from the text of the user's utterance voice signal;
detecting an expansion domain, being related to the extracted first utterance element and second utterance element, in a hierarchical domain model, when a user action script, comprising a main action corresponding to the first utterance element and a component slot corresponding to the second utterance element, is included in the expansion domain, wherein the hierarchical domain model comprises a plurality of candidate domains of a lowermost concept and the expansion domain, including at least two candidate domains, of an uppermost concept;
detecting at least one candidate domain related to the detected expansion domain when the user action script is included in the candidate domain;
determining the at least one candidate domain related to the detected expansion domain as a final domain;
detecting a candidate domain, when the user action script is included in the candidate domain and the expansion domain is not detected;
transmitting information regarding the first and second utterance elements and information regarding the determined final domain as a result of the voice recognition to an external apparatus; and
receiving response information related to the first and second utterance elements within the determined final domain from the external apparatus.

12. The method according to claim 11 further comprising:
detecting at least one candidate domain including the user action script; and
determining a domain as the expansion domain when two or more of the detected candidate domains comprise a hierarchy with the domain as a common superior concept.

13. The method according to claim 11, wherein the detecting the expansion domain comprises: using a multi classifier to detect a subordinate candidate domain related to the detected expansion domain, where the main action corresponding to the first utterance element and the component slot corresponding to the extracted second utterance element are matched to each other is detected, and
when the expansion domain is not detected, the detecting the expansion domain incorporates using a multi-classifier to detect a candidate domain, where the main action corresponding to the first utterance element and the component slot corresponding to the second utterance element are matched to each other.

14. The method according to claim 11, wherein the detecting the expansion domain comprises using at least one binary classifier to detect at least one domain from among the candidate domains, where the main action corresponding to the first utterance element and the component slot corresponding to the second utterance element are matched to each other, and the expansion domain.

15. The method according to claim 13, wherein the determining the final domain comprise determining a user's intention from at least one of the extracted first and second utterance elements and the detected candidate domain to determine whether or not a context initialization occurred, and in response to determining that the context initialization has not occurred, determining at least one candidate domain from among the detected candidate domains as the final domain based on a previous domain, the previous domain being a domain determined from a user's previous utterance voice before receiving the text of the user's utterance voice signal.

16. The method according to claim 15, wherein the determining the final domain comprises determining the previous domain as the final domain in response to one candidate domain from among the detected candidate domains and the previous domain corresponding to each other.

17. The method according to claim 16, wherein the determining the final domain comprises determining the candidate domain related to the first utterance element representing the user action from among the at least one candidate domain related to the detected expansion domain as the final domain, in response to determining that the detected candidate domain and the previous domain are different from each other or the context initialization has occurred.

18. The method according to claim 17, wherein the determining the final domain comprises determining all the detected candidate domains as the final domain, in response to the detected candidate domain including main action information corresponding to the first utterance element representing the user action.

19. The method according to claim 18, wherein the determining the final domain comprises determining the candidate domain selected by a user as the final domain or arbitrarily selecting one candidate domain from among the detected candidate domains as the final domain, in response to the detected candidate domain including the main action information corresponding to the first utterance element representing the user action.

20. The method according to claim 17, wherein the determining the final domain incorporates determining the candidate domain corresponding to the previous domain from among the detected candidate domains as the final domain, in response to there being a plurality of previous domains, one of the plurality of previous domains and one of the candidate domains corresponding to each other, and the candidate domain including main action information corresponding to the first utterance element representing the user action.

* * * * *